US009052212B2

(12) United States Patent
Doan et al.

(10) Patent No.: US 9,052,212 B2
(45) Date of Patent: Jun. 9, 2015

(54) DYNAMIC DESTINATION MAP DISPLAY FOR NAVIGATION SYSTEM

(75) Inventors: Linh Doan, Torrance, CA (US); Mike Iao, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 552 days.

(21) Appl. No.: 13/553,545

(22) Filed: Jul. 19, 2012

(65) Prior Publication Data

US 2012/0283946 A1 Nov. 8, 2012

Related U.S. Application Data

(63) Continuation of application No. 12/386,417, filed on Apr. 17, 2009, now Pat. No. 8,255,150.

(51) Int. Cl.
| | |
|---|---|
| *G06Q 30/00* | (2012.01) |
| *G01C 21/36* | (2006.01) |
| *G06Q 30/08* | (2012.01) |

(52) U.S. Cl.
CPC .......... *G01C 21/367* (2013.01); *G01C 21/3682* (2013.01)

(58) Field of Classification Search
CPC .............................. G06Q 30/06; G06Q 30/08
USPC .................................. 705/26.1, 27.1; 701/461
See application file for complete search history.

(56) References Cited

U.S. PATENT DOCUMENTS

| | | |
|---|---|---|
| 5,450,343 A | 9/1995 | Yurimoto et al. |
| 5,699,255 A | 12/1997 | Ellis et al. |
| 2006/0247855 A1 | 11/2006 | de Silva et al. |

*Primary Examiner* — James Zurita
(74) *Attorney, Agent, or Firm* — Muramatsu & Associates

(57) ABSTRACT

A map display apparatus and method for a navigation changes a map scale dynamically to help the driver visualize the environment of the destination when the vehicle is approaching the destination. The map scale is changed dynamically to display the destination along with at least one map attribute near the destination to provide more information to the driver. The navigation system includes, among others, a searching unit and a scale changing unit to change the map scale to display the destination along with at least one map attribute when the vehicle is approaching the destination. The navigation system also includes a priority table to prioritize the map attributes and the searching unit searches the map attributes near the destination according to order in the priority table.

11 Claims, 11 Drawing Sheets

| Map Attribute | Search Distance |
|---|---|
| Major Street | < 0.5 miles |
| Brand POI | < 0.5 miles |
| Park | < 0.5 miles |
| School | < 0.5 miles |
| Landmark | < 0.5 miles |
| Freeway On Ramp | > 0.5 miles or <1 mile |
| Freeway Segment | > 1 mile |

FIG. 4

DYNAMIC DESTINATION MAP DISPLAY FOR NAVIGATION SYSTEM

This is a continuation of U.S. patent application Ser. No. 12/386,417, filed Apr. 17, 2009, the entire contents of which are incorporated herein by reference.

FIELD OF THE INVENTION

This invention relates to a map display apparatus and method for a navigation system, and more specifically, to a map display apparatus and method which changes map scales dynamically to provide a driver more accurate environmental information around a destination when the vehicle is approaching the destination.

BACKGROUND OF THE INVENTION

Recently, vehicle navigation systems have become more popular and affordable for most vehicle drivers. The navigation system can, not only determine the driver's current position by utilizing the Global Positioning System (GPS), but also provide different routing information between the vehicle's current position and the destination. In order to perform above noted functions, the navigation system is usually equipped with navigation computer programs and one or more detailed database to store and provide information on maps, map attributes, road networks, geographical features and points-of-interests (POI), etc.

Generally, when a destination is specified by the driver, the navigation system generates a calculated route which is a preferred or optimized route to the destination. The calculated route is usually displayed associated with a map in a highlighted manner on a display unit in the vehicle. However, even with the aid of the navigation system, the driver may still miss the destination if the destination is new to the driver or the driver is unfamiliar with the environment nearby the destination.

Even though the driver is relatively familiar with the environment nearby the destination, if he approaches the destination in a direction different from that of the past experience, he may lose sight of the destination. Under these circumstances, the driver may need more geographical information near the destination, such as major streets, landmarks, brand POIs, etc., to help the driver visualize the environment of the destination. With such visualized information around the destination, the driver can have better sense when the vehicle is approaching the destination.

In order to provide the driver better sense and help the driver visualize the environment near the destination, a map with dynamic scale to display some geographical features near the destination has been developed in navigation systems. U.S. Pat. No. 5,699,255 issued to Ellis et al. discloses a navigation system which is able to tailor the map information and then transmits the information to the driver. In one embodiment, the navigation system of Ellis et al. provides the map information of varying degrees of resolution and detail.

However, as shown in FIGS. 1a and 1b of Ellis et al., the driver has to manually operate the pull-down window to select the scale of the map resolution 110 and the detail level 120. In other words, the map resolution as well as the details are not dynamically changed when the vehicle is approaching the destination. Further, the driver may be distracted from the safe driving when he has to manually operate the pull-down window in the system.

U.S. Pat. No. 5,450,343 issued to Yurimoto et al. discloses a navigation device adapted to display a starting point and a route search beginning point at the highest possible scale. The navigation device can display a part of the searched route (calculated route) and the vehicle's present position at the highest possible scale when the vehicle is traveling on the searched route. As shown in FIGS. 2a and 2b, when the vehicle 210 is approaching the route search beginning point 220, the map scale is changed at the highest possible level in a predetermined area 240 to help the driver better visualize the environment of the search beginning point 220 and the route 230.

Although the map scale in Yurimoto et al. is changed dynamically, the map is designed to accommodate some specific points, such as a starting point and a route search beginning point, or a search ending point and a destination point, at the highest possible scale. However, if the search ending point is far away from the destination point, even though the map is changed to the highest possible scale, it may still be difficult for the driver to visualize the environment of the destination. Furthermore, the search ending point may not be a major street or a landmark associated with the destination, thus, it does not provide substantial help to the driver to understand more about the environment of the destination.

Therefore, there remains a need for a new and improved map displaying apparatus and method for a navigation system which provides the driver more geographical or environmental information close to the destination to help the driver better visualize the arrival of the destination, such that the possibility for the driver to miss the destination will be significantly reduced.

SUMMARY OF THE INVENTION

It is an object of the present invention to provide a map displaying method and apparatus for a navigation system to assist the driver better visualize a destination where the map scale changes dynamically to display the destination along with at least one map attribute near the destination.

It is another object of the present invention to provide a priority table of map attributes wherein the navigation system in the present invention starts searching the map attributes according to a priority list in the table when the vehicle is within a predetermined distance from the destination, and dynamically changes the map scale to display the map attributes with the destination.

It is another object of the present invention to provide a map displaying method and apparatus for a navigation system which allows the user to determine the priority of the map attributes according to his or her own preference and the environment near the destination.

It is still another object of the present invention to provide a map displaying method and apparatus for a navigation system where the map scale changes dynamically to display at least one map attribute with at least a portion of the calculated route when the vehicle is deviating from the calculated route.

According to one aspect of the present invention, a navigation system has a dynamic map display apparatus which is activated when a vehicle is approaching a destination. The dynamic map display apparatus includes a display unit configured to display routing information, maps and map attributes in various scales; an information receiver adapted to receive information about current location of a vehicle from a global positioning system (GPS); at least one database to store and provide maps, road networks, geographical features, and POI information; a position and distance measuring unit which is programmed to retrieve the map and road network data from the database and provide position and distance information.

The display unit may include a map scale changing unit which is adapted to change the map scale to accommodate at least one map attribute associated with the destination to provide the driver more accurate information on the environment of the destination.

In one embodiment, the navigation system includes a priority table in which different map attributes, such as major streets, brand POIs, parks, schools, etc., are prioritized to be displayed along with the destination in the map. The navigation system may further include a searching unit, for example, if the destination is located at a rural area where no major street or road is located nearby, the searching unit will look for the brand POI near the destination. If there is still no brand POI close to the destination, the searching unit will look for the next map attribute in the priority table until an appropriate map attribute is found.

In another aspect, a method of displaying dynamic map scale when the vehicle is approaching the destination includes the steps of: inputting a destination, calculating the route and providing routing information, searching for map attributes within a predetermined distance of the destination, determining the most appropriate map scale in which both the destination and map attribute can be displayed, and displaying the confirm map destination screen at the system selected map scale.

In one embodiment of the method, the step of searching for the map attributes within a predetermined distance of the destination includes searching the map attributes in a priority table where the map attributes are prioritized in a priority list, such that if the system can not find a specific map attribute near the destination, the system can keep searching the next map attribute in the priority list until it is found.

According to the present invention, the navigation system automatically changes the map scale to help the driver better visualize the environment of the destination when the vehicle is approaching the destination. The map scale is changed dynamically to display the destination along with at least one map attribute near the destination to provide more environmental information to the driver. Thus, because of this enhanced environmental information, even if the driver is unfamiliar with the destination, he will not miss the arrival at the destination.

The present invention together with the above and other advantages may best be understood from the following detailed description of the embodiments of the invention illustrated in the drawings below.

BRIEF DESCRIPTION OF THE DRAWINGS

FIG. 4 illustrates an example of priority table to prioritize map attributes to be displayed with the destination on the display unit in accordance with the present invention.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

All publications mentioned are incorporated by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described in the following.

The present invention relates to a map display apparatus and method in a navigation system where the scale of the map is dynamically changed to help the driver better visualize the environment of the destination when the vehicle is approaching the destination. More specifically, the map scale is changed dynamically to display the destination along with at least one map attribute near the destination to provide more environmental information to the driver. Thus, because of the environmental information, even if the driver is unfamiliar with the destination, he will not miss the arrival at the destination.

Furthermore, the navigation system in the present invention provides a priority list in a priority table to prioritize the map attributes. In other words, if one map attribute does not exist near the destination, the navigation system will search for the next map attribute in the priority list until an appropriate map attribute near the destination is found. After the appropriate map attribute is found, the map scale is changed dynamically to display the destination with the map attribute.

Figure 1A:
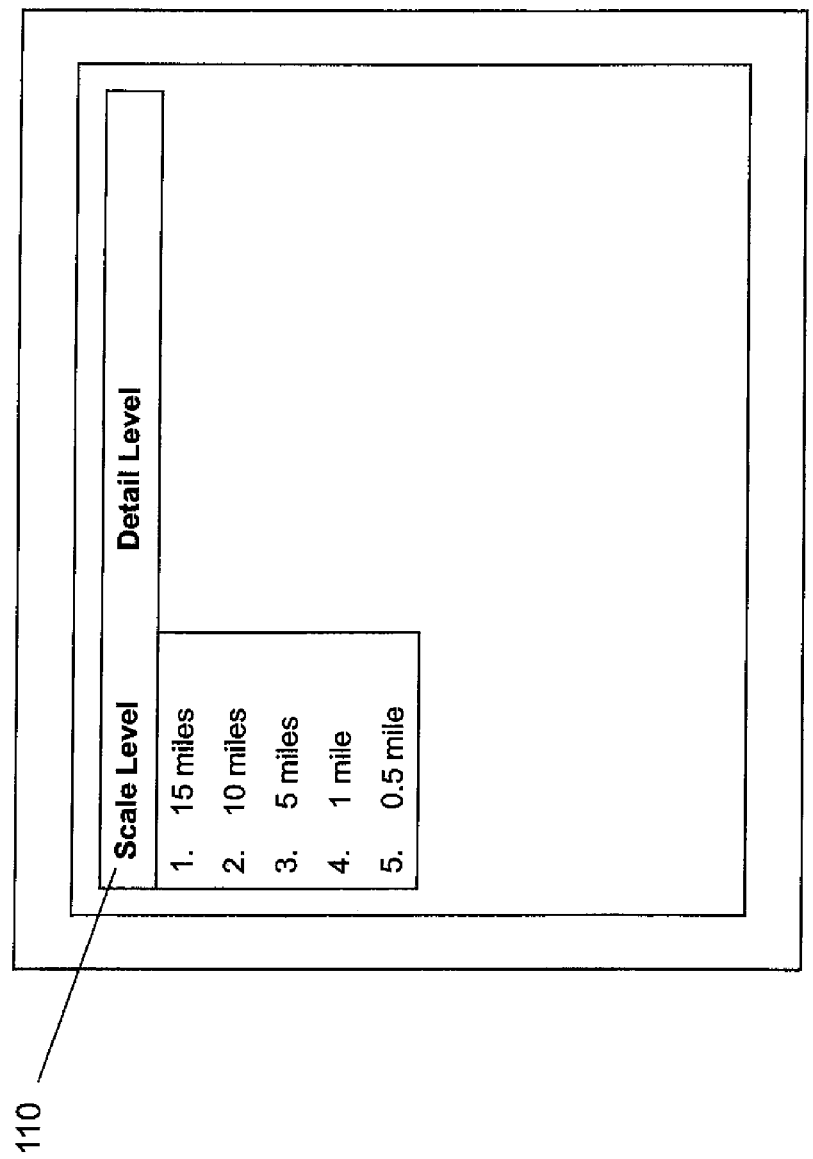
FIGS. 1a and 1b are schematic diagrams showing an example of conventional technology in which a map scale and a detail level on a display of the navigation system can be manually adjusted.
Figure 1B:
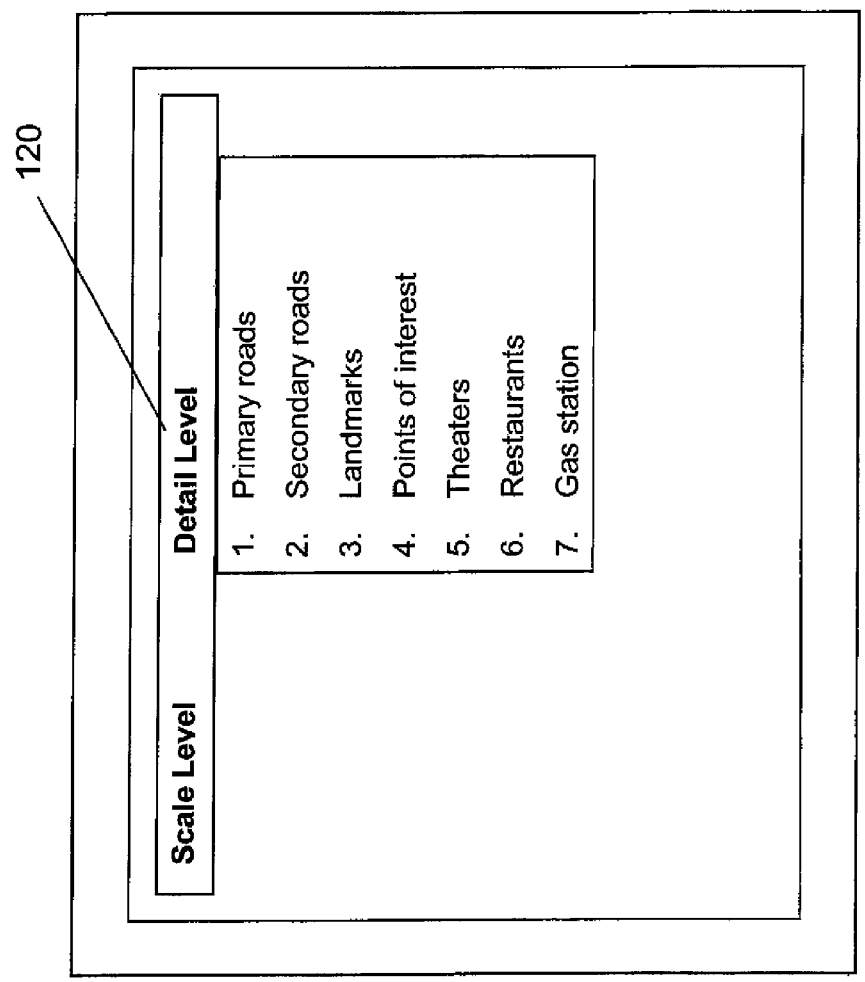
Figure 2A:
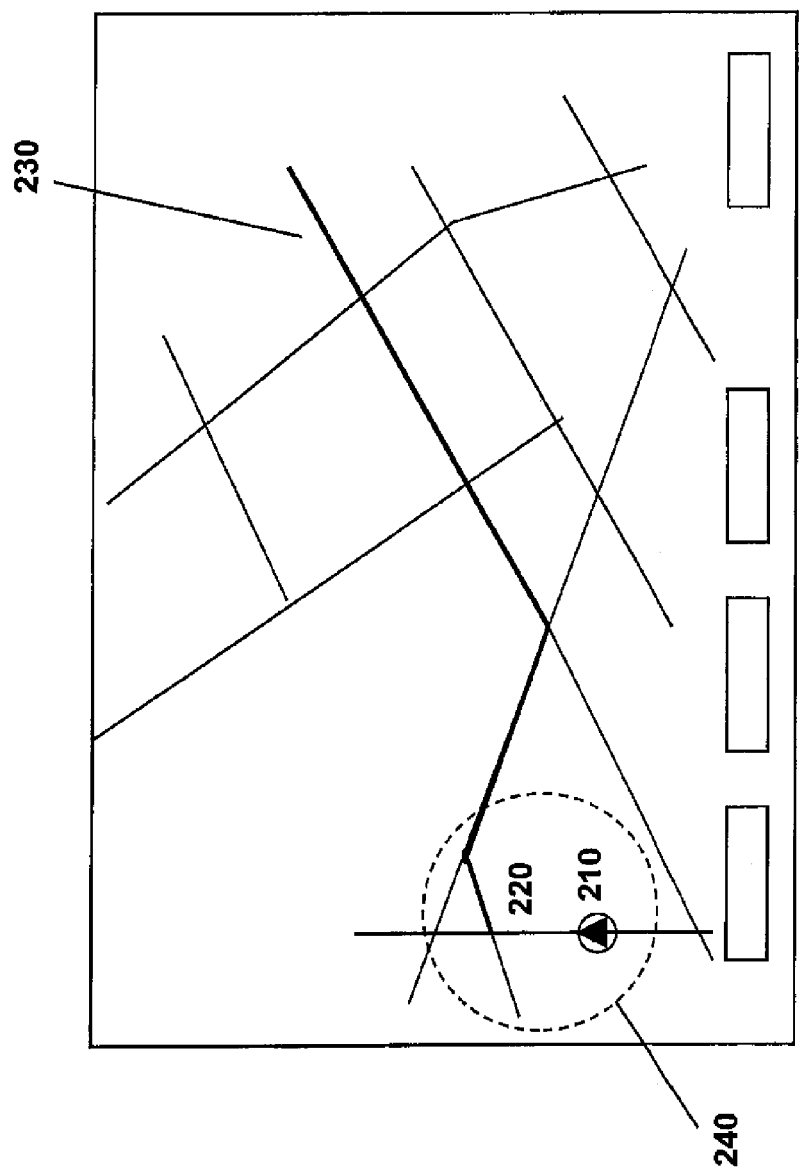
FIGS. 2a and 2b are schematic diagrams showing another example of conventional technology in which a map scale can be changed automatically when the vehicle is approaching a route search beginning point.
Figure 2B:
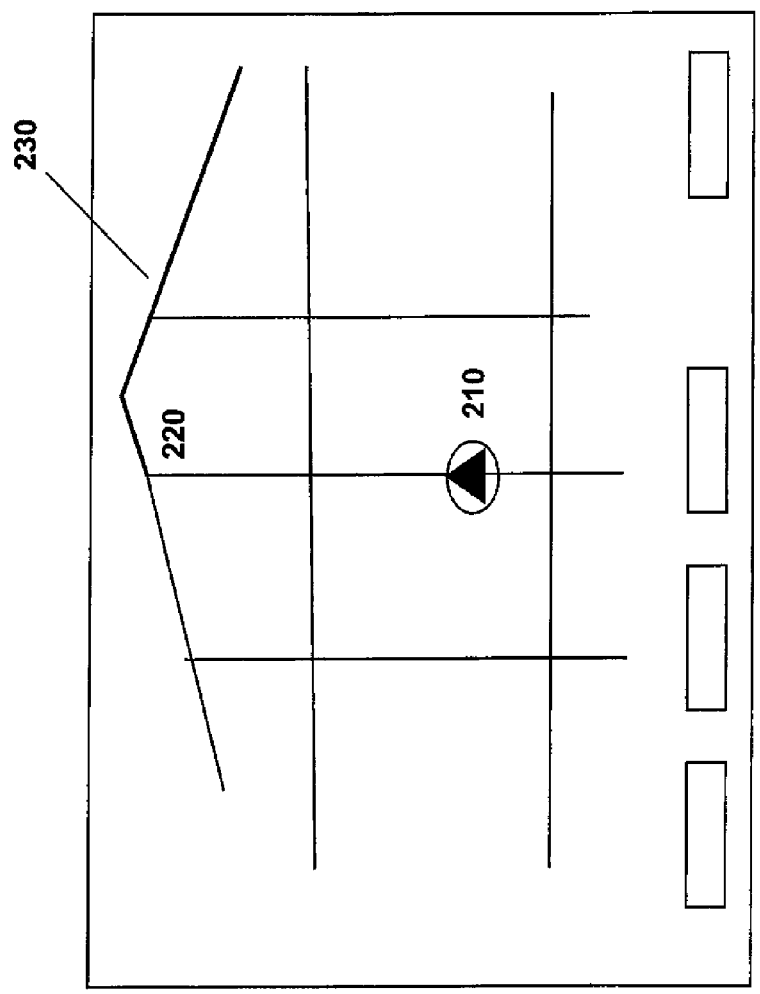
Figure 3:
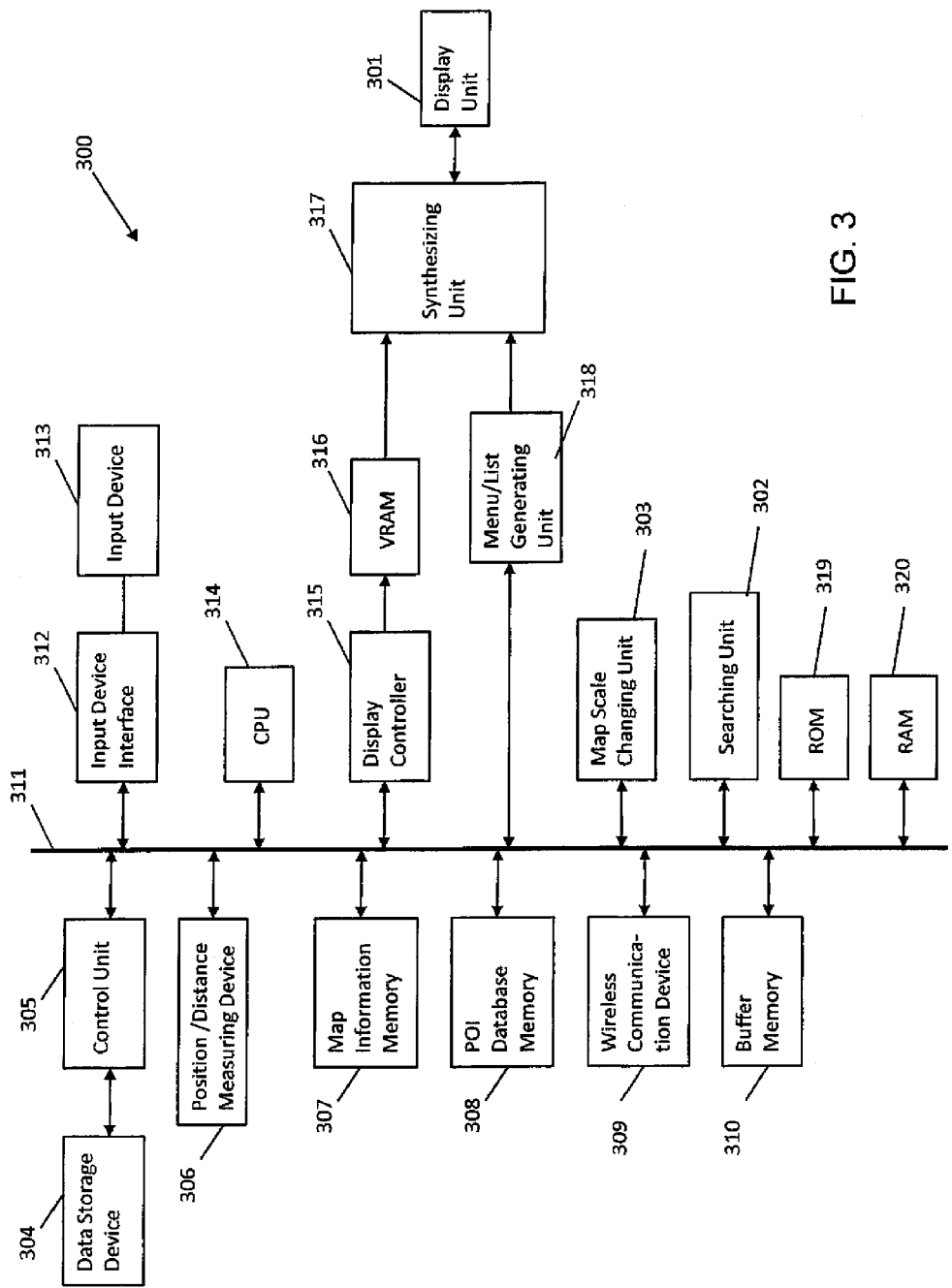
FIG. 3 is a functional block diagram showing an example of structure of a vehicle navigation system implementing the dynamic map display apparatus and method of the present invention.

FIG. 3 is a block diagram showing an example of structure of a vehicle navigation system 300 for implementing the present invention. As can be seen in FIG. 3, the navigation system 300 includes a display unit 301, a searching unit 302 adapted to search for at least one map attribute near the destination, a map scale changing unit 303 adapted to dynamically change the map scale to display the destination with the map attribute(s) found by the searching unit 302 in an appropriate map size. The navigation system also includes a data storage device 304 such as a hard disc, CD-ROM, DVD or other storage means for storing the map data. The navigation system includes a control unit 305 for controlling an operation for reading the information from the data storage device 304, and a position and distance measuring device 306 for measuring the present vehicle position or user position. For example, the position and distance measuring device 306 has a vehicle speed sensor for detecting a moving distance, a gyroscope for detecting a moving direction, a microprocessor for calculating a position, a GPS (Global Positioning System) receiver for receiving GPS signals from satellites for calculating a current position of the vehicle.

The block diagram of FIG. 3 further includes a map information memory 307 for storing the map information which is read from the data storage device 304, a database memory 308 for storing database information such as a point of interest (POI) information which is read out from the data storage device 304, an input device 313 for executing a menu selection operation, an enlarge/reduce operation, a destination input operation, etc., and an input device interface 312. In one embodiment, the input device 313 is a remote controller.

Still referring to FIG. 3, the navigation system 300 includes a bus 311 for interfacing the above units in the system, a processor (CPU) 314 for controlling an overall operation of the navigation system 300, a ROM 319 for storing various control programs such as a route search program and a map matching program necessary for navigation operation, a RAM 320 for storing a processing result such as a guide route, a display controller 315 for generating a map image (a map guide image and an arrow guide image) on the basis of the map information, a VRAM 316 for storing images generated by the display controller 315, a menu/list generating unit 318 for generating menu image/various list images, a synthesizing unit 317, a wireless communication device 309 to retrieve data such as traffic data from a remote server, and a buffer memory 310 for temporary storing data for ease of data processing.

Figure 7:
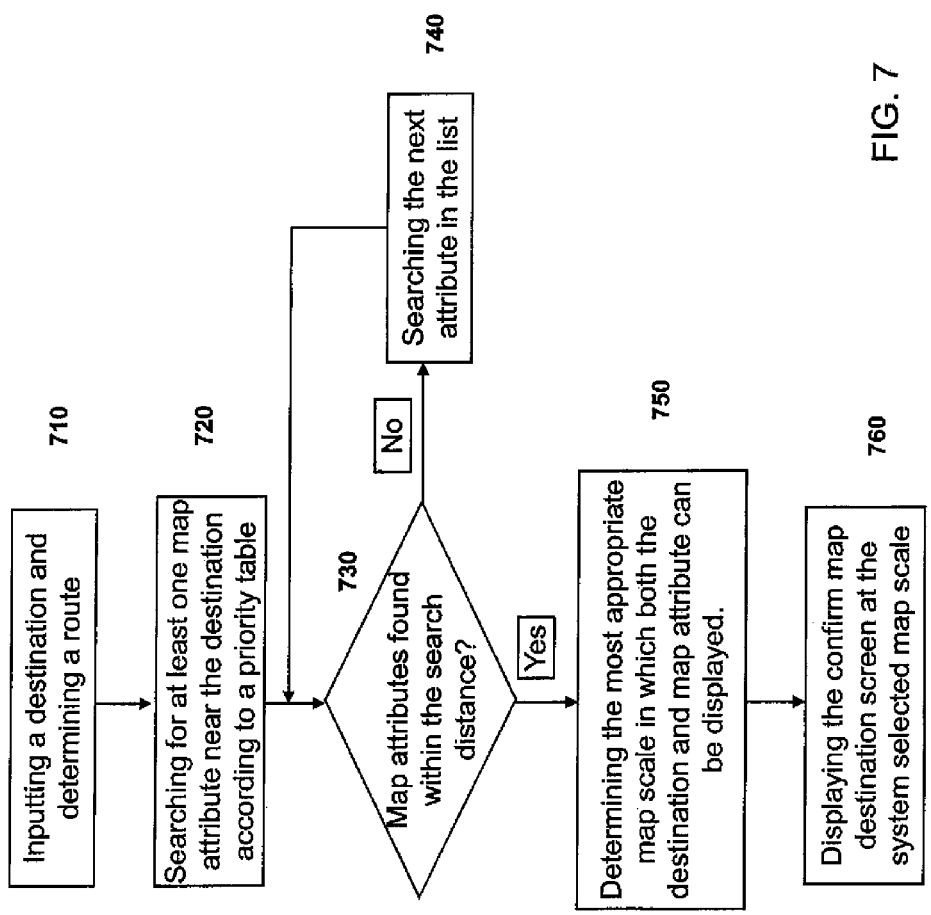
FIG. 7 is a flow chart showing an example of operational steps involving the method of displaying a dynamic map scale of the present invention to accommodate at least one map attribute and the destination when the vehicle is approaching the destination.

A program for conducting the operation of the dynamic map display in the present invention shown in the flow chart of FIG. 7 is stored in the ROM 319 or other memory and is executed by the CPU 314. The CPU 314 controls an overall operation of the navigation system in the conventional technology in addition to the dynamic map display apparatus and method of the present invention.

Although not shown in the block diagram of FIG. 3, the navigation system 300 further includes a priority table 400 as illustrated in FIG. 4. Namely, FIG. 4 shows an example of the priority table 400 to prioritize the map attributes to be displayed with the destination on the display unit in accordance with the present invention. In the priority table 400, different map attributes 410, such as major streets, brand POIs, parks, schools, etc., are prioritized in a priority list 411. In one embodiment, at least one map attribute in the priority list 411 is displayed along with the destination (typically, a destination mark or icon on the map image) in the display unit 301.

The searching unit 302, as illustrated above with reference to FIG. 3, is adapted to search the map attributes 410 near the destination according to the priority list 411 in the priority table 400. Namely, when the vehicle is approaching the destination, the searching unit 302 starts a process of searching the map attributes 410 according the priority order of "Major Street", "Brand POI", "Park", . . . etc. as defined by the priority list 411. The searching unit 302 continues the searching operation until at least one appropriate map attribute 410 is found near the destination.

In addition, the priority table 400 also provides search distance information 420 for the searching unit 302. For example, as shown in FIG. 4, when the position and distance measuring device 306 indicates that the vehicle is within a predetermined distance to the destination, the searching unit 302 is then triggered to search, according to the priority list 411, "Major Street", within 0.5 miles from the destination. If no major street is found within the search distance, the searching unit 302 searches for the next map attribute in the priority list 411, i.e., "Brand POI", within 0.5 miles from the destination.

As described above, the searching unit 302 will keep searching for at least one map attribute according to the priority list 411 within the search distance until an appropriate one is found. In one embodiment, the order of the map attributes in the priority list is pre-established in default by a provider of the navigation system. In another embodiment, the user is allowed to modify the priority list 411 as well as the search distance 420, according to the driver's preference or the environment of the destination.

Figure 5A:
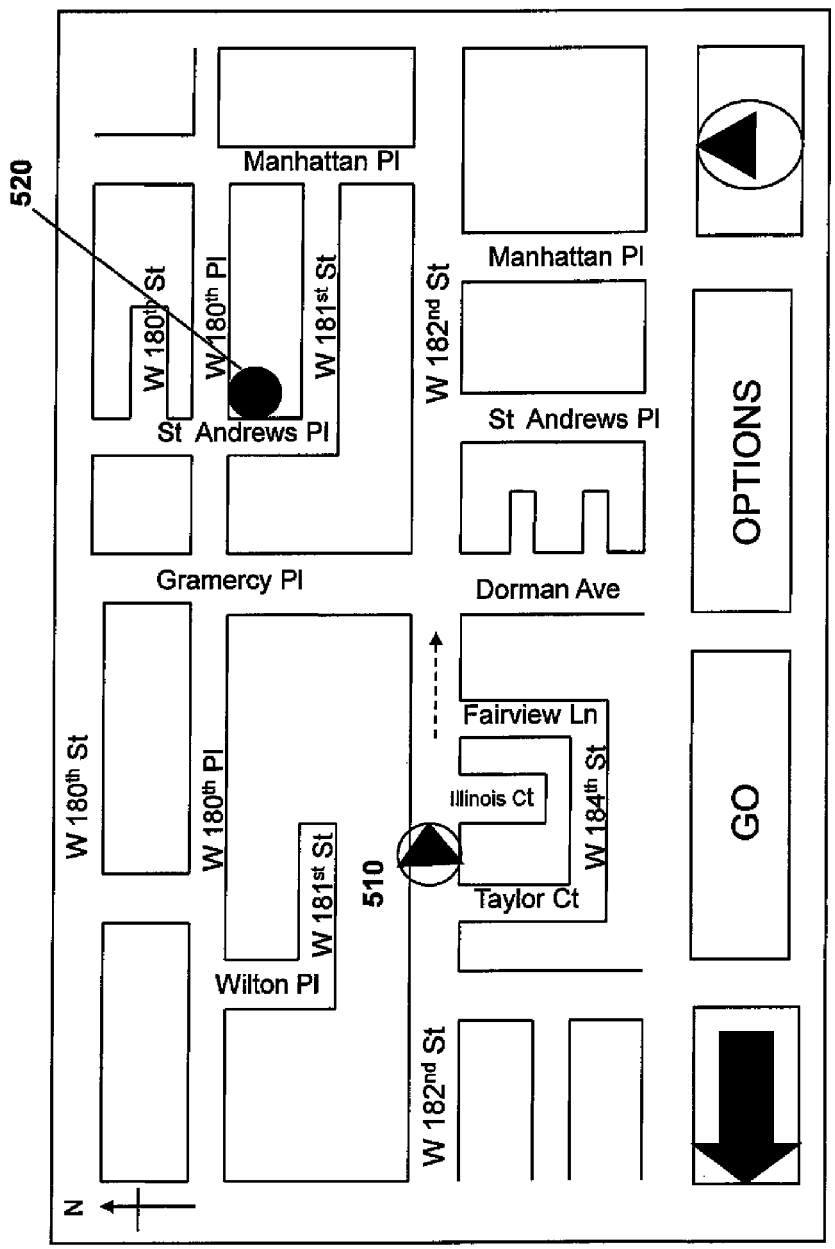
FIGS. 5a and 5b illustrate display examples according to one embodiment of the present invention in which the map scale changes dynamically to accommodate the major streets and the destination when the vehicle is approaching the destination.
Figure 5B:
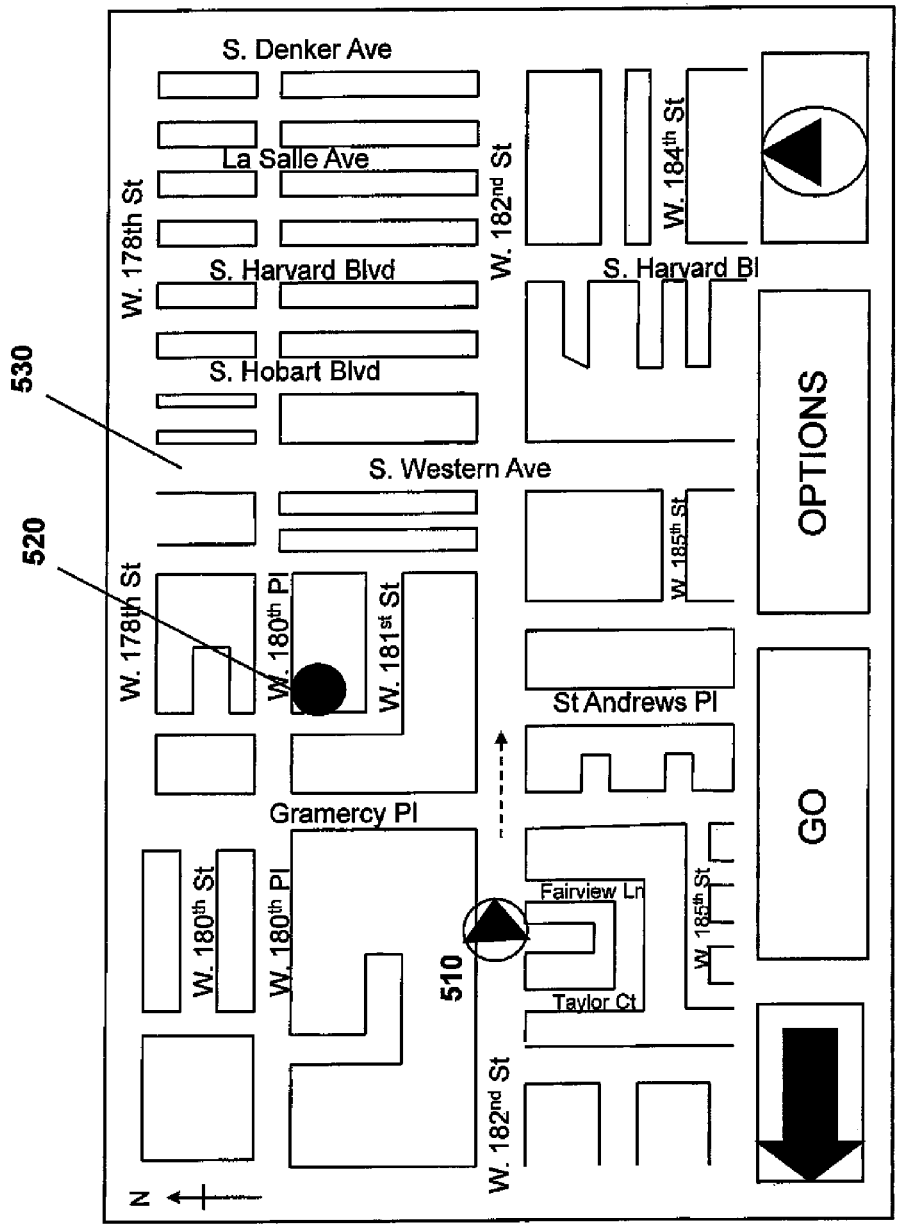

FIGS. 5a and 5b illustrate display examples according to the present invention in which the map scale changes dynamically to accommodate the major streets and the destination when the vehicle is approaching the destination. As exemplified in FIG. 5a, a vehicle 510 is driven toward a destination 520. When the position and distance measuring unit 306 determines that the vehicle 510 and the destination 520 are within a predetermined distance, the searching unit 302 is triggered to search the map attributes according to the priority list 411 as shown in FIG. 4. As noted above, this searching operation continues until the searching unit 302 finds at least one appropriate map attribute in the neighborhood of the destination.

For example, according to the priority list 411, the searching unit 302 begins the search from "Major Street" near the destination. As can be seen in FIG. 5b, one "Major Street" 530 is found by the searching unit 302 and the information is transmitted to the map scale changing unit 303 to dynamically change the map scale to display the map attribute, i.e., "Major Street" 530, along with the destination 520. Thus, the driver can better visualize the environment of the destination 520 by receiving more geographical information nearby the destination 520 and the possibility for the driver to miss the destination 520 will be significantly reduced.

Figure 6A:
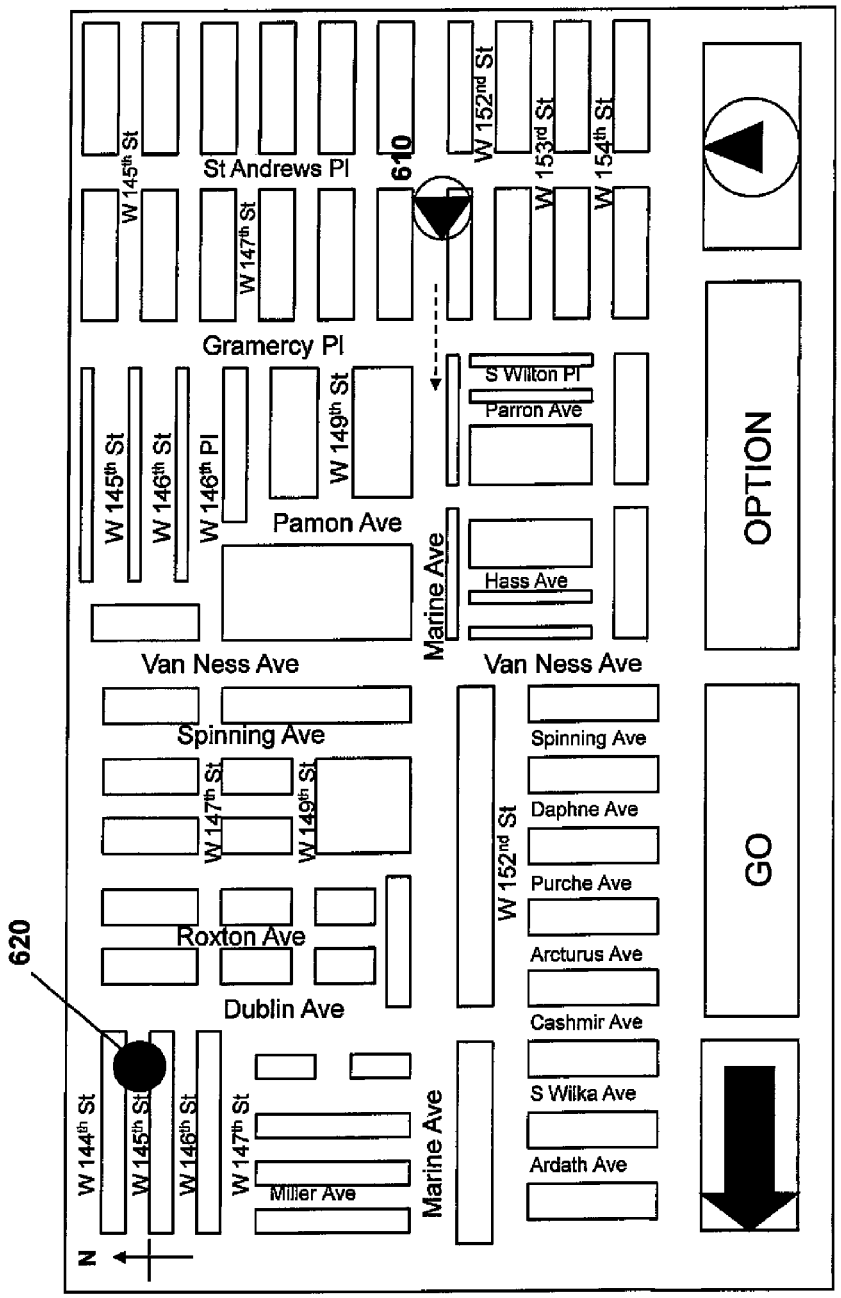
FIGS. 6a and 6b illustrate display examples according to another embodiment of the present invention in which the map scale changes dynamically to accommodate the park (landmark) and the destination when the vehicle is approaching the destination.
Figure 6B:
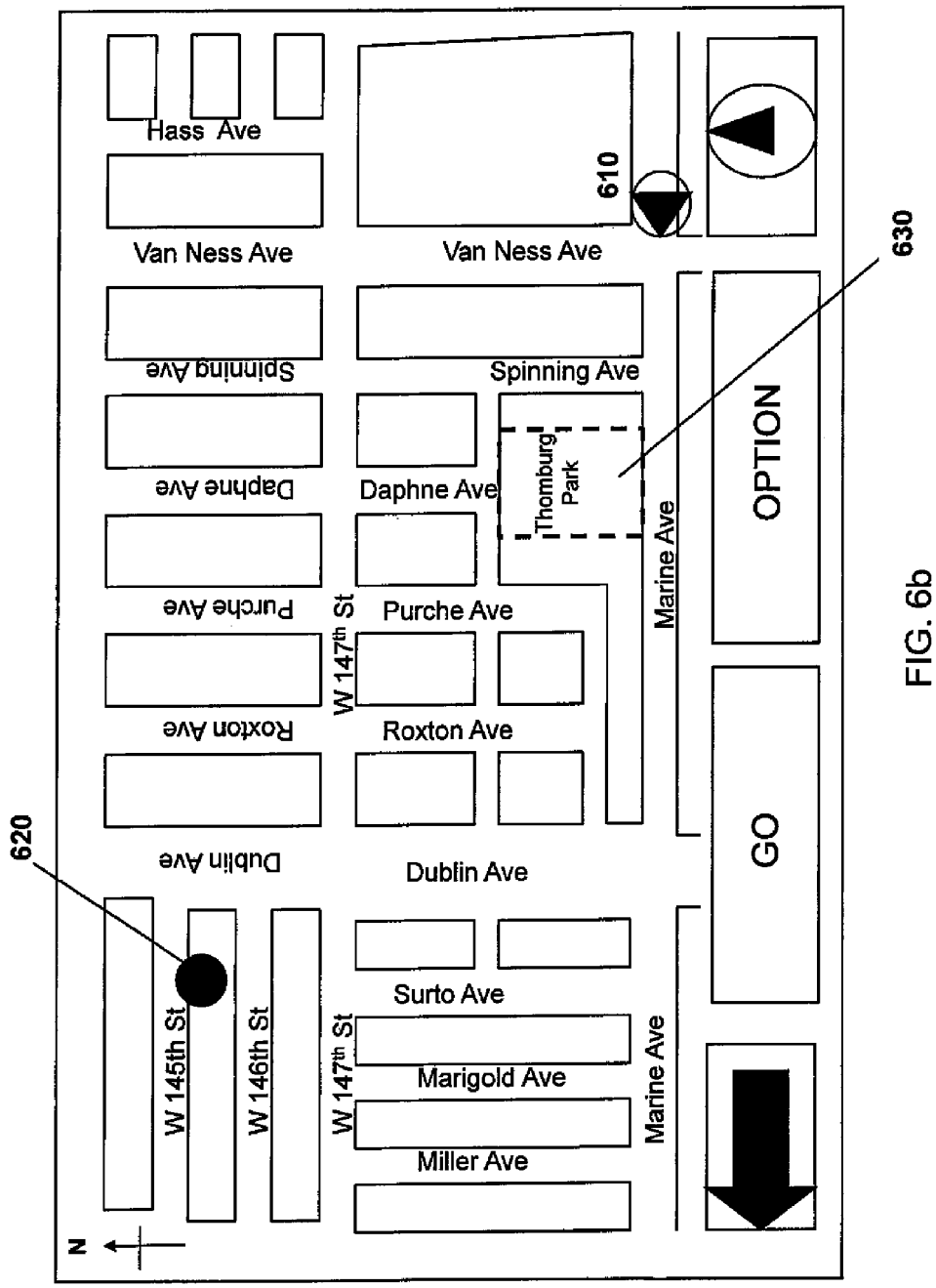

FIGS. 6a and 6b illustrate display examples according to another embodiment of he present invention in which the map scale changes dynamically to accommodate the park (landmark) and the destination when the vehicle is approaching the destination. In the example of FIG. 6a, when a vehicle 610 and a destination 620 are within a predetermined distance, the searching unit 302 starts searching the map attributes according to the priority list 411 as shown in FIG. 4. As noted above, the searching unit 302 begins the search from "Major Street" near the destination 620 since this map attribute is in the highest priority according to the priority list 411.

However, if there is no "Major Street" near the destination, the searching unit 302 then searches the next map attribute "Brand POI" within the search distance 420. If there is still no "Brand POI" found near the destination, the searching unit 302 would keep searching the next map attributes according to the priority list 411 until at least one appropriate map attribute is found. For example, if there is neither "Major Street" nor "Brand POI" near the destination 620 in FIG. 6b, the searching unit 302 searches the next map attribute "Park"

in the priority list 411. As can be seen in FIG. 6b, a park 630 (Thornburg Park) is found by the searching unit 302 and the map attribute information on the park 630 is transmitted to the map scale changing unit 303 to dynamically change the map to an appropriate scale to display the park 630 with the destination 620 on the same display screen.

A flow chart of FIG. 7 shows an example of operational steps involving the method of displaying a dynamic map scale of the present invention to accommodate at least one map attribute and the destination on a navigation screen when the vehicle is approaching the destination. In step 710, the user inputs a destination and the navigation system determines an optimum route to the destination. As known in the art, such an optimum route will be determined based on the map data from the data storage device 304 (map database) and from the position and distance measuring device 306 (speed pulse, gyroscope, GPS, etc).

During the route guidance operation, when the position and distance measuring device 306 indicates that the vehicle is within a predetermined distance from the destination, the searching unit 302 is triggered to search for at least one map attribute defined in the priority table 400 (FIG. 4) in step 720. Then, in step 730, the process determines whether an appropriate map attribute in the priority list 411 is found within the search distance. If so, the information is transmitted to the map scale changing unit 303 and an appropriate map scale is determined in step 750. In step 760, the system confirms the map scale and displays the destination along with one or more map attributes.

As stated above, the searching unit 302 searches for the map attribute based on the priority list defined in the priority list 411. In other words, if the top priority map attribute, for example, "Major Street" is not found within the search distance, the searching unit 302 would search the next map attribute "Brand POI" in the priority list within the search distance, in step 740, until the appropriate map attribute is found. Once the appropriate map attribute is found, it is displayed with the destination in the appropriate map scale determined by steps 750 and 760.

As has been described above, according to the present invention, the navigation system automatically changes the map scale to help the driver better visualize the environment of the destination when the vehicle is approaching the destination. The map scale is changed dynamically to display the destination along with at least one map attribute near the destination to provide more environmental information to the driver. Thus, because of this enhanced environmental information, even if the driver is unfamiliar with the destination, he will not miss the arrival at the destination.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A map display apparatus for a navigation system comprising:
   a display unit;
   an information receiver adapted to receive position information about a current location of a vehicle;
   at least one database to store and provide maps, map attributes, road networks, geographical features, and point-of-interest (POI) information;
   a position and distance measuring unit for measuring a distance between the vehicle and a destination; and
   a searching unit,
   wherein when the position and distance measuring unit indicates that the vehicle is within a predetermined distance to the destination, the searching unit starts searching for at least one map attribute located within a predetermined search distance from the destination, and the map attribute is displayed with the destination, and
   wherein the navigation system further comprises a map scale changing unit adapted to dynamically change a map scale that displays, at the same time, both the destination and at least one map attribute located within a predetermined search distance from the destination detected by the searching unit.

2. The map display apparatus for a navigation system as defined in claim 1, wherein the navigation system further comprises a priority table in which the map attributes are prioritized in a form of a priority list for said searching unit to search.

3. The map display apparatus for a navigation system of claim 2, wherein the priority table defines a search distance measured from the destination to each map attribute.

4. The map display apparatus for a navigation system as defined in claim 3, wherein the searching unit searches the priority list starting from a first map attribute in the priority list.

5. The map display apparatus for a navigation system as defined in claim 4, wherein the searching unit searches a next map attribute in the priority list when a previous map attribute or attributes in the priority list do not exist in the search distance.

6. The map display apparatus for a navigation system as defined in claim 1, wherein once the searching unit detects at least one map attribute located within the predetermined search distance from the destination, the map attribute information is transmitted to the map scale changing unit to dynamically change the map scale to display both the map attribute and the destination at the same time.

7. An apparatus for displaying a map including a destination along with at least one map attribute, comprising:
   a display unit;
   a plurality of input buttons adapted to accept user instructions;
   a position and distance measuring unit; and
   a searching unit,
   wherein the position and distance measuring unit indicates that the vehicle is within a predetermined search distance to a destination and said searching unit starts searching for at least one map attribute within the predetermined search distance from the destination to be displayed with the destination in the same map, and
   wherein the apparatus comprises a map scale changing unit adapted to dynamically change a map scale that displays, at the same time, both the destination and at least one map attribute located within a predetermined search distance from the destination detected by the searching unit.

8. The apparatus of claim 7, wherein the apparatus further comprises a priority table in which the map attributes are prioritized in a form of a priority list for said searching unit to search.

9. The apparatus of claim 8, wherein the priority table defines a search distance measured from the destination to each map attribute.

10. The apparatus of claim 9, wherein the searching unit searches the priority list starting from a first map attribute in the priority list and searches a next map attribute in the priority list when a previous map attribute or attributes in the priority list do not exist in the search distance.

11. The apparatus of claim 7 wherein once the searching unit detects at least one map attribute located within the predetermined search distance from the destination I the map attribute information is transmitted to the map scale changing unit to dynamically change the map scale to display both the map attribute and the destination at the same time.

\* \* \* \* \*